United States Patent [19]

Ban

[11] 3,742,320

[45] June 26, 1973

[54] TAPE FAST FEED CONTROL APPARATUS FOR ENDLESS MAGNETIC TAPE CARTRIDGE PLAYER

[76] Inventor: Itsuki Ban, 829, Higashi-Oizumimachi, Nerima-ku, Tokyo, Japan

[22] Filed: May 10, 1971

[21] Appl. No.: 141,621

[30] Foreign Application Priority Data

May 11, 1970 Japan ............................. 45/39292

[52] U.S. Cl. ................................... 318/6, 274/4 D

[51] Int. Cl. ............................................ B65h 59/38

[58] Field of Search .................... 318/6, 7; 274/4 D

[56] References Cited

UNITED STATES PATENTS

| | | | |
|---|---|---|---|
| 3,244,955 | 4/1966 | Turner et al. | 318/7 |
| 3,269,670 | 8/1966 | Brian, Jr. et al. | 318/7 X |
| 3,218,529 | 11/1965 | Evans et al. | 318/7 |
| 3,254,287 | 5/1966 | Wolfner | 318/7 X |
| 3,117,262 | 1/1964 | Mullin | 318/7 |

*Primary Examiner*—T. E. Lynch
*Attorney*—Jacobs & Jacobs

[57] ABSTRACT

A tape fast feed control apparatus for an endless magnetic tape cartridge player, which comprises a motor driven tape feeding means, the motor being adapted to selectively control its rotational speed so as to normally feed the tape at low speed or fast feed it at high speed, a switch for changing rotation of the motor from low speed to high speed, and a changing means for change-over operation of the switch, the changing means being arranged to normally maintain the switch in a first position where the motor is rotated at low speed, the changing means including an operating member and adapted to change over the switch to a second position where the motor is rotated at high speed in response to manual operation of the operating member, the changing means being further adapted to change over the switch from the second position to the first position after the period proportional to a number of operations of the operating member, whereby the tape is fast fed by the period as designated by a number of operations of the operating member.

8 Claims, 4 Drawing Figures

TAPE FAST FEED CONTROL APPARATUS FOR ENDLESS MAGNETIC TAPE CARTRIDGE PLAYER

BACKGROUND OF THE INVENTION

This invention relates to a tape fast feed control qpparatus for an endless magnetic tape cartridge player, and more particularly to an apparatus of such a class that a pre-designated amount of the tape is fast fed and thereafter the tape is automatically fed in a normal fashion.

Endless magnetic tape cartridge players have been widely used, for instance, in a motorcar but are ineffective in that since it is difficult to freely make a choice of music or the like recorded on the tape, listeners are compelled to listen to the music which is not desired. This is entirely derived from absence of a simply operated tape fast feed means by which the tape that records such undesired music can be fast fed. The driver must continually devote his attention to the driving of his car and nothing else, and is therefore unable to turn his attention to manually stop a tape fast feed after a suitable amount of the tape is fast fed in order to listen to a desired music.

Briefly, the invention involves the recognition that, by operation of a pushbutton, disadvantages found in a conventional fast feed apparatus may be eliminated, a tape fast feed control apparatus is provided so that the fast feed is automatically stopped after fast feeding the amount of the tape proportional to a number of operations of the pushbutton whereby a desired amount of the tape can easily be fed during car-driving and that a choice of music may readily made.

SUMMARY OF THE INVENTION

It is a general object of the invention to provide a tape fast feed control apparatus for an endless magnetic tape cartridge player wherein the time during which the tape is fast fed is pre-designated by a number of operations of an operating member such as a pushbutton and wherein a fast feed of the tape is automatically terminated to change the tape to a normal feed after the predetermined time during which the tape is fast fed.

Another object of the invention is to provide a tape fast feed control apparatus wherein the rotational speed of a motor for driving the tape can be changed from high to low in relation to closing and opening of a switch and wherein the switch is changed by a changing means from and to a first position where the motor is slowly rotated to normally feed the tape or a second position where the motor is quickly rotated to fast feed the tape.

A further object of the invention is to provide a tape fast feed control apparatus wherein a switch is changed from a first position to a second position by a changing means in relation to operation of an operating member to switch over the tape from a normal feed to a fast feed and thereafter the switch is automatically changed from the second position to the first position after a predetermined period.

Still another object of the invention is to provide a tape fast feed control apparatus wherein the period for which a switch is changed by a changing means from a second position to a first position may be varied in proportion to a number of operations of an operating member and wherein the time period during which the tape is fast fed may be pre-designated by a number of operations of the operating member.

Yet another object of the invention is to provide a tape fast feed control apparatus wherein the a speaker connected to a tape reproducing circuit is muted during a fast tape feed but is fully operable during normal tape speed.

Further object and additional features of the invention will become apparent from the following detailed description and annexed drawings, wherein:

DESCRIPTION OF THE PREFERRED EMBODIMENTS

Figure 1:
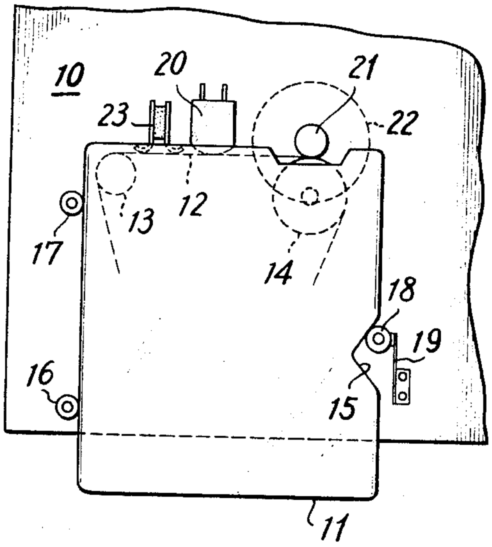
FIG. 1 is a schematic view explanatory of an embodiment of an endless magnetic tape cartridge player in which an apparatus of the present invention is employed.

Referring now to the drawings, and in particularly to FIG. 1, numeral 10 indicates a horizontal deck within a housing (not shown) for an endless magnetic tape cartridge playing apparatus. Mounted on the deck 10 are guide members 16, 17 and 18 for providing a way for an endless magnetic tape cartridge 11 and holding it in a playing position. The guide member or retention member 18 is mounted on a leaf spring 19 one end of which is firmly mounted on the deck 10, and is pressed against a notch 15 on the side of the cartridge 11. By pressure of the retention roller 18 against the inclined wall of the notch 15 in the cartridge 11, a forward force is exerted on the cartridge 11 to place it in the playing position with respect to a magnetic head 20 and a rotary capstan 21. Built in the cartridge 11 are an endless magnetic tape 12, a tape guide 13, and a pinch roller 14. The capstan 21 in the instant embodiment serves as an output shaft for a motor 22 mounted under the deck 10 and upwardly extends from the deck by passing through an aperture (not shown) bored through the deck. The capstan 21 is adapted to cooperate with the pinch roller 14 received in the cartridge 11 when the cartridge is urged into its playing position. The tape 12 which is driven by the capstan 21 and the pinch roller 14 may run across the end mark detector 23 and the head 20.

In view of the fact that the shaft of the motor 22 functions as the capstan, the rate of rotation of the capstan is relative to the rate of rotation of the shaft of the motor and is caused to be in the range of 700 r.p.m. when the tape feed is at normal or rated speed. This is one-third to one-sixth of the rate of rotation of the motor of this class. For this reason, a governor assembly is required, and, for this size of motor, such an assembly is preferably electrical rather than mechanical in operation. When the motor 22 is rotated after disengagement from the electronic governor, the rate of rotation thereof will be increased from three to six times its normal rate so as to allow the tape to be fed as quickly as possible.

Figure 2:
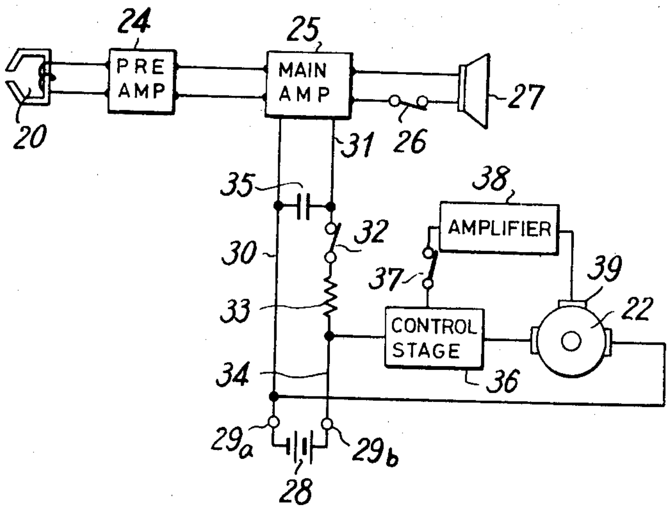
FIG. 2 is a block schematic diagram of a circuit for controlling high tape feed.

A block diagram shown in FIG. 2 is one form of circuit for controlling the rate of rotation of motor 22 so as to obtain a quick tape transport in accordance with the invention.

Referring to FIGS. 1 and 2, the magnetic head 20 comes into a slidable contact with the tape 12 through the leading edge window of the cartridge 11. The output of the magnetic head 20 is obtained in the form of an aural signal which is applied to a speaker 27 through a reproducing reproducing pre-amplifier 24, reproducing main amplifier 25 and switch or contact 26. The main amplifier 25 is connected by a lead 30 to a plus terminal 29*a* of a power source 28 and to a minus terminal 29*b* of the power source by a lead 31, switch or contact 32, resistor 33, and lead 34.

The motor 22 is supplied through a control stage 36 with a transistor (not shown) of the electronic governor circuit with armature current from the power source 28. The input terminal of the control stage 36 is connected through a switch or contact 37 to the output terminal of an amplifier 38 in the electronic governor circuit. A pickup element or coil 39 generates an electromotive force in response to the rate of rotation of the motor 22 and this output is applied to the amplifier 38 in the electronic governor circuit. That is to say, when an electromotive force is applied to the amplifier 38, it represents a deviation from a reference rate of rotation and is allowed to be a feedback to the transistor (not shown) in the control stage 36 so that the speed of the motor is controlled. Opening of the contact 37 allows the output to take a direction where the transistor (not shown) in the control stage 36 is energized so that the motor 22 is released from the control of rotation thereof and is, therefore, rotated at fast speed. The contacts 26, 32 and 37 are adapted so that they are operatively opened and closed in association with one another.

In operation with respect to the circuit as shown in FIG. 2, the contact 37 is closed so that the output of the amplifier 38 is applied to the control stage 36 of the electronic governor circuit thus causing the motor 22 to rotate at normal speed due to the fact that the rotation of the motor 22 is being controlled by the governor circuitry of control state 36. As a result, the endless tape 12 is fed at normal speed to effect the aural play of the tape.

Upon opening the contacts 26, 32 and 37, a current supply from the power source 28 to the main amplifier 25 is cut off to render the main amplifier 25 inactive and to disconnect the speaker 27 to prevent a reproducing sound of the tape 12 from coming out from the speaker 27. At the same time an output of the amplifier 38 is not applied to the control stage 36 and the motor 22 is released from control of its rotation of the electronic governor circuit and is thus rotated at full speed. In other words, the tape 12 is fed at high speed to cut off a reproducing sound from the speaker 27 relative to opening of the contacts 26, 32 and 37.

Next, closing of the contact 37 causes the amplifier 38 to apply its output to the control stage 36 thereby allowing the electronic governor circuit to be activated so that rotation of the motor 22 is changed from full speed to normal speed after a selected time period to change the tape feed from fast to normal. On the other hand, upon closing the contact 37 with the contacts 26, 32 being closed, the main amplifier 25 is connected with the speaker 27 and a current supply is applied from the power source 28 to the main amplifier 25 after a time delay which is determined by the resistor 33 and the condenser 35. Accordingly, the main amplifier 25 initiates its actuation. If the values of the resistor 33 and the condenser 35 are suitably selected so that a time constant determined by the resistor 33 and the condenser 35 is more than the period during which the motor 22 is changed from full speed to normal speed, no tape reproducing sound will come out from the speaker 27 until the tape 12 is returned from fast feed to normal speed. In other words, noisy and undesired reproducing sound at high level and high frequency is cut off when the tape 12 is changed from fast feed to normal feed.

Figure 3:
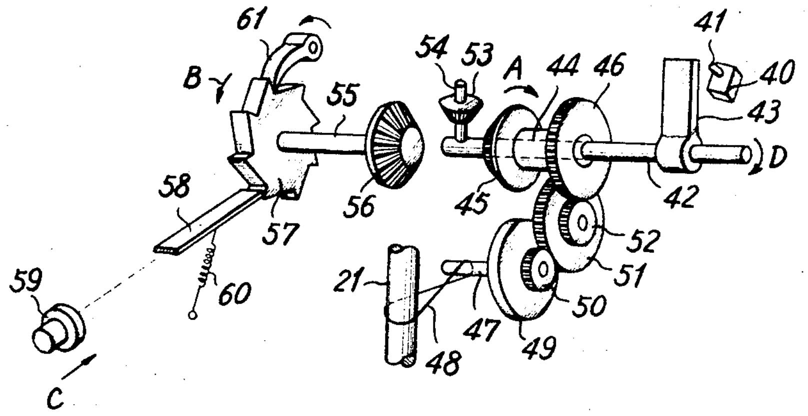
FIGS. 3 and 4 are perspective views each showing forms of the respective changing means for changing over the switch shown in FIG. 2.

FIG. 3 shows one form of a changing means for controlling opening and closing of the contacts 26, 32, and 37 to effect a change over of the tape from and to fast feed or normal feed. Numeral 40 designates a microswitch which comprises three sets of contact groups corresponding to the contacts 26, 32 and 37 and includes an actuator 41. A shaft 42 is rotatably supported by a suitable bearing (not shown) and is frictionally engaged by an actuating member or lever 43 for operating the actuator 41 for the microswitch 40. A sleeve 44 is rotatably mounted to the shaft 42 and carries at one end a bevel gear 45 and at the other end a gear 46. The sleeve 44 receives rotation by the rotary shaft 47 which is connected by a belt 48 to the capstan 21 serving as the shaft for the motor (FIGS. 1 and 2) and which is rotated by the capstan 21, and the sleeve 44 is rotated in the direction of the arrow A through reduction gear trains 49, 50, 51, 52 and 46. A bevel gear 53 which differentially meshes with the bevel gear 45 is rotatably supported by an axis 54 one end of which is mounted to the shaft 42.

A shaft 55 is rotatably supported by a suitable bearing (not shown) in alignment with the shaft 42 and carries a bevel gear 56 which differentially meshes with the bevel gear 53. The distance between the bevel gear 45 and the bevel gear 56 is exaggerated in FIG. 3 as if gear 56 does not mesh with the bevel gear 53, but they actually do mesh together. A ratchet wheel 57 is rigidly fixed to the shaft 55 and is adapted to engage a ratchet pawl 58 which is made of leaf spring and includes at one end an operating member or push button 59. The ratchet wheel 58 is biased by a spring 60 against a position shown in FIG. 3. The pushbutton 59 is provided outwardly of the housing (not shown) of the tape cartridge playing apparatus and is adapted to be manually operated. A detent pawl 61 is biased by a spring (not shown) in the direction of the arrow as shown and engages with the ratchet wheel 57.

The changing means shown in FIG. 3 is arranged so that the lever 43 normally depresses the actuator 41 of the microswitch 40 to close the three sets of contact groups included therein. That is to say, the contacts 26, 32 and 37 (FIG. 2) are closed to drivingly transport the tape 12 at normal speed. At this point, manual depression of the pushbutton 59 in the direction of the arrow C against the bias of the spring 60 allows the ratchet pawl 58 to rotate the ratchet wheel 57 in the direction of the arrow B by one tooth. Rotation of the ratchet wheel 57 is imparted through the shaft 55, the bevel gear 56, the bevel gear 53, and the axis 54 to the shaft 42. Accordingly, the lever 43 is retracted, as shown in FIG. 3, from the microswitch 40, and depression of the microswitch 40 by the lever 43 is released to drive the tape 12 at fast speed. With the feed of the tape, the shaft 42 is rotated synchronously with the capstan 21 through the belt 48, the shaft 47, the gear trains, the sleeve 44, the bevel gear 45, the bevel gear 53 and the axis 54, and the shaft is rotated in the direction of the arrow D. After lapse of the period of the time determined by a number of depressions of the pushbutton 59, the lever 43 depresses the actuator 41 of the microswitch 40 to terminate the fast speed of the tape so that the tape is then driven at normal speed. After the lever 43 is engaged by the actuator 41 of the microswitch 40, the lever 43 slips against the shaft 42 rotatable with the capstan 21. The number of teeth of the ratchet wheel 57 and the gear ratio each of the gear trains, and bevel gears 45, 53, 56 are designed so that the length of the tape corresponding to that which is fed at normal speed for one minute can be fast fed by one depression of the pushbutton 59. For this reason, three depressions of the pushbutton fast feeds the length of the tape corresponding to that is fed for three minutes and thereafter the tape is changed to normal feed. That is to say, the time during which the tape is fast fed can be designated by the number of depressions of the pushbutton 59.

Figure 4:
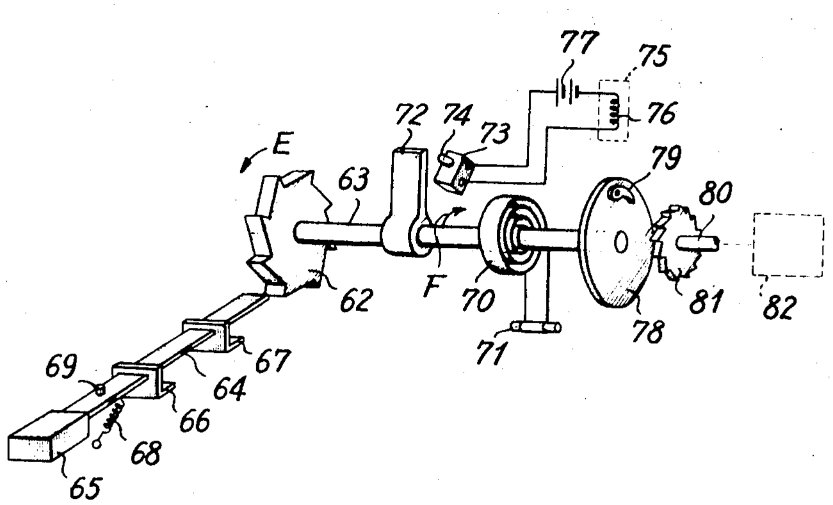

FIG. 4 shows another form of the changing means for effecting a fast or normal feed of the tape. A ratchet wheel 62 is secured to a rotary shaft 63 at one end thereof. A ratchet pawl 64 is slidably supported by guide members 66, 67 and includes at one end an operating member or pushbutton 65. The ratchet pawl 64 is engaged at the other end with the ratchet wheel 62. The ratchet pawl 64 is biased by a spring 68 to the position shown in FIG. 4. When the ratchet pawl 64 is depressed through the pushbutton 65 against the bias of the spring 68 until a stopper pin 69 over the ratchet pawl 64 abuts against the guide member 66, the ratchet wheel 62 is rotated by one tooth in the direction of the arrow E. The pushbutton 65 projects from a control panel (not shown) of the tape cartridge playing apparatus.

The shaft is urged in the direction of the arrow F by a coil spring 70 of which one end is secured to a fixed pin 71. An actuating member or lever 72 is attached to the shaft 63 and a microswitch 73 is mounted along the region of rotation of the lever 72 which is rotatable with the shaft 63. The microswitch 73 includes an actuator 74 depressed by the lever 72, and a contact (not shown) which is opened when the actuator 74 is depressed by the lever 72 and closed when the actuator 74 is moved away from the lever 72. An exciting coil 76 of an electromagnetic relay 75 is connected through the microswitch 74 to a power source 77. The relay 75 includes the contacts 26, 32 and 37 (FIG. 2), and each of the contacts is opened when the relay 75 is energized from the power source 77 and closed when it is deenergized. Therefore, the contacts 26, 32 and 37 (FIG. 2) are closed when the microswitch 73 is depressed by the lever 72 so that the tape is fed at normal speed. On the other hand, the contacts 26, 32 and 37 are opened when the microswitch 73 is moved away from the lever 72 so that the tape is fed at fast speed.

A disk 78 is mounted to the shaft 63 and is provided with a pawl 79. A rotary shaft 80 is mounted to align with the shaft 73 and is provided at one end with a ratchet wheel 81 which is engageable with the pawl 79. The shaft 80 carries at the other end a movement 82 connected thereto. The movement 82 comprises a mechanical governor such as a self-timer. The pawl 79 and the ratchet wheel 81 are related with each other so that they are engaged with each other when the shaft 63 is rotated in the direction of the arrow F and disengaged when the shaft is rotated in a direction reversed to the arrow F. With this arrangement, only the shaft 63 is rotated when the ratchet wheel 62 is rotated in the direction of the arrow E through the pushbutton 65 and the ratchet pawl 64, however, the shaft 80 with the shaft 63 is rotated by the movement 82 which controls its rotational speed when the shaft 63 is rotated by the bias of the coil spring 70 in the direction of the arrow F.

The changing means shown in FIG. 4 is designed so that the pushbutton 65 is manually operated to rotate the ratchet wheel 62 in the direction of the arrow E by means of the ratchet pawl 64 to allow the lever 72 to move away from the microswitch 73 thereby changing the tape from normal feed to fast feed, and thereafter the shaft 63 is rotated by the bias of the coil spring 70 in the direction of the arrow F while its rotational speed is controlled by the movement 82 and at the same time the microswitch 73 is actuated by the lever 72 to automatically complete the fast tape feed to thus change the tape to normal feed. From this it is apparent that if the pushbutton 63 is depressed n times, a tape length *n* times as long as is fast fed by one depression of the pushbutton 63 can be fast fed and the tape is automatically changed to normal feed at the completion of the fast feed.

As described in the above, according to the present invention, the tape transport at high or normal speed is readily and automatically effected so that the tape can be conveniently used for many purpose.

Although the invention has been described with reference to specific means for practising the invention, it is apparent that many modification may be made by one skilled in the art, and accordingly, it is intended that the scope of the invention be limited only as defined in the following claims.

What is claimed is:

1. A tape fast forward feed control apparatus for an endless magnetic tape cartridge player, comprising: a tape feeding means for feeding the endless tape in a normal forward speed mode and a fast forward speed mode; a motor for driving the tape feeding means; an electrical source for energizing the motor; a governor means coupled between the motor and the electrical source for controlling the flow of current from the electrical source to the motor; a switch for controlling operation of the governor means, the motor being rotated at a low speed to feed the tape at normal forward speed under control of the governor means when said switch is in a first position, the motor being rotated at high speed to feed the tape at fast forward speed when said switch is changed over from the first position to a second position; a changing means for effecting a change over operation of the switch, said changing means including an actuating member rotatable to operate the switch, a first driving device for intermittently moving said actuating member from an effective position where the switch is maintained in the first position to a non-effective position where the switch is maintained in the second position, an operating member manually operable to successively operate said first driving device, and a second driving device for continuously moving said actuating member back from said non-effective position to said effective position, said changing means being operable to change the switch from the first position to the second position in relation to operation of said operating member to thus fast forward feed the tape and to change the switch over from the second position to the first position after a period of time proportional to the number of operations of said operating member to automatically terminate tape fast forward feed and thereby feed the tape at the normal forward feed rate.

2. A tape fast feed control apparatus as described in claim 1 wherein said first driving device includes a ratchet wheel attached to a rotary shaft, and a ratchet pawl movable to mesh with the ratchet wheel, the ratchet wheel being intermittently rotated by the ratchet pawl in relation to manual operation of said operating member.

3. A tape fast feed control apparatus as described in claim 2 wherein said operating member is a pushbutton attached to said ratchet pawl.

4. A tape fast feed control apparatus as described in claim 3 wherein said shaft to which said ratchet wheel is attached is connected by a differentially meshable gearing to a shaft to which said actuating member is mounted.

5. A tape fast feed control apparatus as described in claim 4 wherein said second driving device comprises said shaft to which said actuating member is frictionally connected, a sleeve loosely mounted to the shaft, a differentially meshable gearing coupled between the shaft and the sleeve, a rotary shaft rotatable by said motor, and a gear train provided between the rotary shaft and the sleeve to reduce rotation of the rotary shaft and to impart rotation thereof to the sleeve.

6. A tape fast feed control apparatus as described in claim 3 wherein said actuating member is rigidly mounted to said shaft to which said ratchet wheel is attached, said second driving device including a coil spring provided on the shaft to impart a rotational force thereto, and a movement coupled to the shaft for controlling a rotational speed of the shaft rotatable by the coil spring.

7. A tape fast feed control apparatus as described in claim 1 additionally comprising a reproducing circuit for reproducing the tape, a speaker connected to the reproducing circuit, and means for disconnecting the speaker from the reproducing circuit when said motor is rotated at its high speed.

8. A tape fast feed control apparatus as described in claim 7 additionally comprising a delay circuit for supplying current to said reproducing circuit after lapse of a predetermined period of the time after changing the motor speed from high speed to low speed.

* * * * *